Jan. 19, 1926.  W. B. HANNER  1,570,565

COMBINED BOLT AND NUT

Filed Feb. 14, 1925

Walter B. Hanner  Inventor

By  Attorney

Patented Jan. 19, 1926.

1,570,565

UNITED STATES PATENT OFFICE.

WALTER B. HANNER, OF GLENWOOD, NORTH CAROLINA.

COMBINED BOLT AND NUT.

Application filed February 14, 1925. Serial No. 9,292.

*To all whom it may concern:*

Be it known that I, WALTER B. HANNER, a citizen of the United States, residing at Glenwood, in the county of Guilford, State of North Carolina, have invented a new and useful Combined Bolt and Nut, of which the following is a specification.

My invention relates to bolts and nuts and especially to a type of nut which will lock on the bolt when screwed to a tightened position.

An object of invention is to provide a nut in which the outer edges of the nut will engage the object against which it is screwed in such a manner as to make a locked connection.

Another object of invention is to provide a sleeve nut of any desired length to fit on a bolt of slightly less length, so that when the nut is in tightened position on the bolt the end of the bolt will be flush with the tip end of the nut.

Another object of invention is to provide a nut in which the central portion of the end is reamed out, leaving a knife-like edge along its outer portion which will engage the head of the bolt against which it is screwed by cutting a furrow in said head and thereby form a binding contact which will not become loosened by continual jarring.

I attain these objects by the mechanism illustrated in the accompanying drawings, in which—

Figure 1:
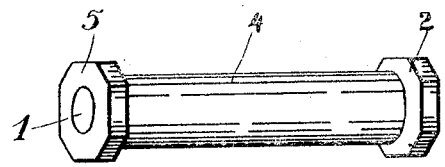
Figure 2:
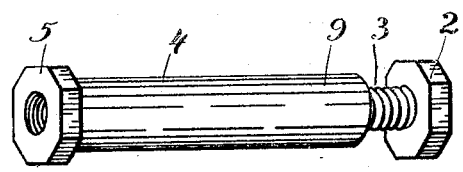
Figure 3:
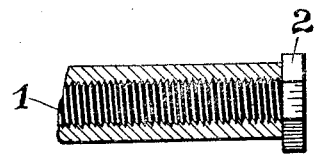
Figure 4:
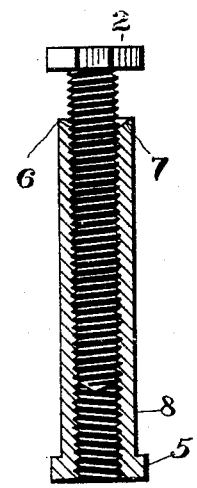

Figure 1 is a perspective view of the bolt and nut, showing the nut securely tightened on the bolt, Figure 2 is a perspective view of my improved nut and bolt, showing the nut loosened on the bolt, Figure 3 is a detail view of a portion of my improved bolt and nut, showing a portion of the nut in section, and the bolt in elevation, with the nut tightened on the bolt, Figure 4 is a view taken along the same lines as used in Figure 3, but showing the nut in loosened position.

Having thus stated the objects of invention, and having given a brief description of the drawings, a more detailed description of the drawings will be given in which like reference numerals represent corresponding parts thruout the drawings.

The numeral 1 represents a bolt with a polygonal shaped head 2, and having threads 3 along its entire length. Upon this bolt 1 there is threadedly engaged the nut 4 which may be of any desired length. This nut 4 has a polygonal head 5 adapted to serve as means whereby the nut may be turned with an ordinary wrench. The end of the nut opposite the polygonal end is designated by the reference numeral 9 and has the peculiar feature of having this end reamed out so as to possess a knife-like edge.

The purpose of this knife-like edge is to cause the nut when tightened to cut a shallow circle in the head of the bolt when screwed against it. This will cause the nut to bind against the head of the bolt and thus prevent it from being loosened by jarring or strain.

It is to be understood that the nut may be of any desired length. In some instances the nut would extend from the polygonal head 5 only to the point 8 and there terminate with the reamed out portion 7 and the knife-like edge 6. In such case any length of bolt could be used, depending on the thickness of the material or materials to be penetrated by the bolt.

The method of operation is as follows:

Suppose two pieces of iron or wood were desired to be bolted together. Holes would be drilled thru the pieces and the bolt 1 inserted therethru. The nut 4 of any desired length would be threaded on the tip end of the bolt and tightened by means of a wrench until the knife-like edge 6 came in contact with the head of the bolt. This knife-like edge would, upon being further tightened on the bolt, cut a circular furrow in the head of the bolt, and thus the nut would be held securely in this furrow in such a manner as to prevent its being loosened by jars or strains.

It will thus be seen that I have produced a bolt and nut which is simple in construction and operation, and one which will remain in the desired position at all times.

What I desire to secure by Letters Patent is:

1. A bolt adapted to penetrate a plurality of pieces of material for the purpose of securing said pieces together, a nut adapted to threadably engage said bolt, said nut having its face portion which is nearest the head of the bolt hollowed at its central portion, and having a knife-like edge of circular formation at the peripheral portion of said face adapted to imbed itself in the head of the bolt when in tightened position.

2. A bolt adapted to penetrate a plurality of pieces of material, a nut threadably engaged on said bolt and also adapted to penetrate the said pieces of material, said nut having a polygonal head, the end of the nut opposite the polygonal head being reamed out to provide a knife-like edge adapted to imbed itself in the head of the bolt, thereby locking said nut and bolt in position.

In witness that I claim the foregoing as my own I have hereunto affixed my signature this the 10th day of February 1925.

WALTER B. HANNER.